(12) United States Patent
Raghavan et al.

(10) Patent No.: US 11,231,912 B2
(45) Date of Patent: *Jan. 25, 2022

(54) POST-DEPLOYMENT MODIFICATION OF INFORMATION-TECHNOLOGY APPLICATION USING LIFECYCLE BLUEPRINT

(71) Applicant: VMWARE, INC, Palo Alto, CA (US)

(72) Inventors: Vijay Raghavan, Mountain View, CA (US); Yahya Cahyadi, San Jose, CA (US); Julie Ann Pickhardt, Boulder, CO (US); Kevin Xie, Palo Alto, CA (US); Douglas Cook, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 15/840,680

(22) Filed: Dec. 13, 2017

(65) Prior Publication Data

US 2018/0165071 A1 Jun. 14, 2018

Related U.S. Application Data

(60) Provisional application No. 62/433,810, filed on Dec. 14, 2016.

(51) Int. Cl.
*G06F 8/35* (2018.01)
*G06F 8/60* (2018.01)

(52) U.S. Cl.
CPC . *G06F 8/35* (2013.01); *G06F 8/60* (2013.01)

(58) Field of Classification Search
CPC .......................................................... G06F 8/35
USPC .......................................................... 717/104
See application file for complete search history.

(56) References Cited

U.S. PATENT DOCUMENTS

| | | | |
|---|---|---|---|
| 6,574,605 B1 | 6/2003 | Sanders et al. | |
| 7,065,493 B1 | 6/2006 | Homsi | |
| 7,805,327 B1 | 9/2010 | Schulz et al. | |
| 8,001,429 B2 | 8/2011 | Breiter et al. | |
| 9,047,133 B2 | 6/2015 | Winterfeldt et al. | |
| 9,052,961 B2 | 6/2015 | Mangtani et al. | |
| 9,170,798 B2 | 10/2015 | Nagaraja et al. | |
| 9,535,669 B2 | 1/2017 | Eksten et al. | |
| 10,061,613 B1* | 8/2018 | Brooker | G06F 9/5005 |
| 2002/0004933 A1 | 1/2002 | Dzoba et al. | |
| 2002/0163544 A1 | 11/2002 | Baker et al. | |
| 2004/0019512 A1 | 1/2004 | Nonaka | |
| 2004/0083448 A1 | 4/2004 | Schulz et al. | |

(Continued)

*Primary Examiner* — James D. Rutten

(57) ABSTRACT

An information-technology (IT) blueprint is an executable document that, when executed, can be used to create an IT application such as an e-commerce site. An IT lifecycle blueprint can further be used to manage (e.g., modify) and, ultimately, destroy such an IT application. To this end, an IT lifecycle blueprint can include idempotent methods that achieve the same result whether starting from a blank (real or virtual) infrastructure or from a previously populated infrastructure. In other words, the same method that created an IT application can be used to modify it. A request for a post-deployment modification can be made using a topological representation of a blueprint and highlighting the representations of components to which a selected modification could be applied.

15 Claims, 7 Drawing Sheets

(56) References Cited

U.S. PATENT DOCUMENTS

| | | | |
|---|---|---|---|
| 2004/0111711 A1* | 6/2004 | Soroker | G06F 8/20 |
| | | | 717/136 |
| 2006/0067252 A1 | 3/2006 | John et al. | |
| 2006/0246955 A1 | 11/2006 | Nirhamo et al. | |
| 2007/0156487 A1 | 7/2007 | Sanabria et al. | |
| 2007/0203778 A1 | 8/2007 | Lowson et al. | |
| 2008/0229307 A1 | 9/2008 | Maeda et al. | |
| 2009/0171707 A1 | 7/2009 | Bobak et al. | |
| 2010/0161366 A1* | 6/2010 | Clemens | G06Q 30/0201 |
| | | | 705/7.29 |
| 2010/0191919 A1* | 7/2010 | Bernstein | G06F 3/0623 |
| | | | 711/141 |
| 2010/0268568 A1 | 10/2010 | Ochs et al. | |
| 2011/0161952 A1* | 6/2011 | Poddar | G06F 16/583 |
| | | | 717/173 |
| 2011/0276977 A1 | 11/2011 | Van et al. | |
| 2011/0321033 A1 | 12/2011 | Kelhar et al. | |
| 2012/0151476 A1* | 6/2012 | Vincent | G06F 9/4856 |
| | | | 718/1 |
| 2013/0232497 A1 | 9/2013 | Jalagam et al. | |
| 2014/0165060 A1* | 6/2014 | Muller | G06F 9/5022 |
| | | | 718/1 |
| 2014/0215049 A1 | 7/2014 | Provaznik | |
| 2015/0280981 A1 | 10/2015 | Sasada et al. | |
| 2015/0304175 A1 | 10/2015 | Maes et al. | |
| 2015/0370538 A1 | 12/2015 | Wang et al. | |
| 2016/0048388 A1 | 2/2016 | Eksten et al. | |
| 2016/0077919 A1 | 3/2016 | Duggan et al. | |
| 2016/0092343 A1* | 3/2016 | Chhatwal | G06F 8/65 |
| | | | 717/124 |
| 2016/0112252 A1* | 4/2016 | Notari | H04L 41/0843 |
| | | | 709/221 |
| 2016/0205037 A1* | 7/2016 | Gupte | H04L 67/10 |
| | | | 709/226 |
| 2016/0234073 A1 | 8/2016 | Maes | |
| 2016/0239595 A1 | 8/2016 | Maes et al. | |
| 2016/0285694 A1 | 9/2016 | Maes | |
| 2017/0351504 A1 | 12/2017 | Riedl | |
| 2018/0165069 A1 | 6/2018 | Xie et al. | |
| 2018/0165071 A1 | 6/2018 | Raghavan et al. | |
| 2018/0165090 A1 | 6/2018 | Raghavan et al. | |
| 2018/0165158 A1 | 6/2018 | Raghavan et al. | |
| 2019/0068622 A1 | 2/2019 | Lin et al. | |

* cited by examiner

POST-DEPLOYMENT MODIFICATION OF INFORMATION-TECHNOLOGY APPLICATION USING LIFECYCLE BLUEPRINT

BACKGROUND

Virtualization has enabled enterprises to implement cloud-based computer systems that meet their needs without having to concern themselves with underlying hardware. Tools are available that allow an enterprise to design a system that meets its needs and to automatically implement the design. Templates of predesigned systems can simplify the design process. For instance, an enterprise desiring an e-commerce site can select from a variety of templates suitable for e-commerce sites. Once the template-based design is selected, and, in some cases, customized for the enterprise, it can be implemented. Upon implementation, the resulting system is available for use and management by the enterprise.

DETAILED DESCRIPTION

Figure 1:
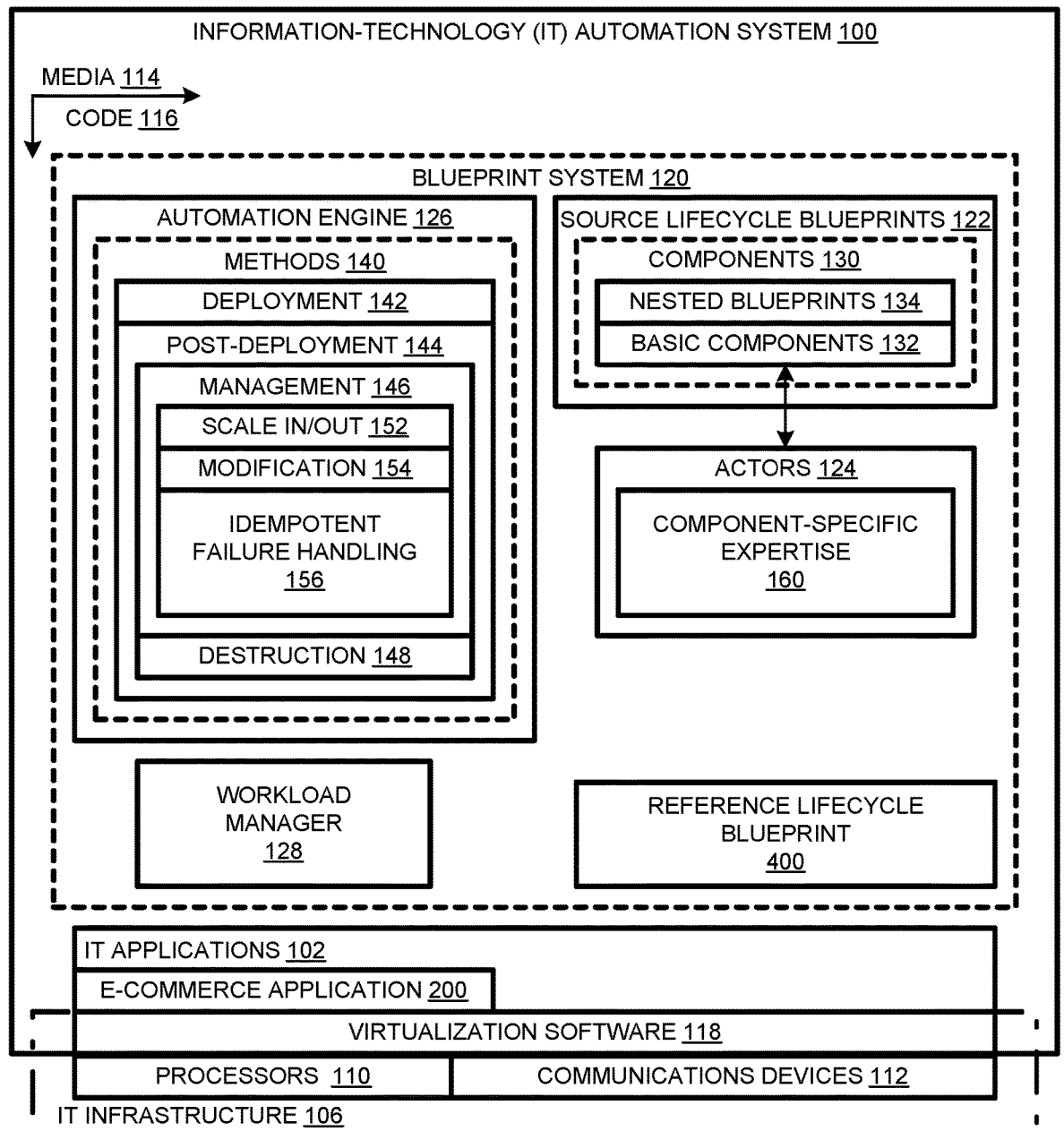
FIG. 1 is a schematic diagram of an information-technology (IT) automation system.

The present invention is directed towards 'lifecycle' blueprints that represent a desired-state model for an IT application. When combined with a conventional "automation engine", the blueprint-driven system contains all the information and expertise needed to deploy a working IT application, as well as to modify and destroy the application after it is deployed.

Herein, an "information-technology blueprint", or, more simply, a "blueprint", is a document that represents the desired topology of an IT application. It is a topological description of all the components that make up the IT application that the blueprint represents. Thus, blueprint components directly correspond to application components. This desired-state model gives the automation engine all the information it needs to deploy a working IT application, as well as to modify and destroy the application after it is deployed.

Each of the components in a blueprint includes properties specific to that component. These properties may either be given specific (default) values right within the blueprint, or given ranges of values from which a final value may be picked when deploying the blueprint. In extreme cases properties may be given no value (default or ranges), and left to be filled in at deployment time.

One example of a property on a blueprint component is the memory to be used for a virtual machine. The blueprint author may specify that the web-tier machine needs an exact memory of 1024 MB or may specify that a range of 1024 MB to 4096 MB would work. In rare cases, the blueprint author may leave the choice of a value for later. Other examples of properties include the port for incoming requests on the web tier, the number of cpus to be used for any of the virtual machines in the application, the port on which the application server component listens for requests, the name of the database schema to be used, etc.

Property values are usually specified directly either by the blueprint author or by an end-user when deploying the blueprint. There is, however, a different way to specify the value for a property, known as a property binding. When a property binding is used, the value of one property on a blueprint component is bound to the value of a different property on a different component in the blueprint. This tells the system to figure out the value of the bound property based on the value of the property it is bound to without giving any user the option to enter a value.

In addition to the application topology and component properties, the blueprint also captures the number of instances of a given application component (say, the application server) to deploy. This is captured through a special property on the blueprint component representing the virtual machine of the application server functional component. As with other properties, this property may also either have a specific value entered in the blueprint, or may just have a range of values set in the blueprint, to be further narrowed later when deploying the application.

Last, the blueprint also captures mutual dependencies between the components within. Such dependencies may either be implicit ones or be explicitly specified by the blueprint author. A property binding to a target property on a blueprint component is an implicit dependency because the value of the bound property cannot be figured out until the blueprint component holding the target property is fully materialized. An explicit dependency, on the other hand, is a user-specified configuration that stipulates that one blueprint component depends on another. Dependencies, whether explicit or implicit, determine the order in which the application components are deployed and managed.

The automation engine includes within it the expertise to handle a set of different kinds of blueprint components. This expertise includes knowledge of how to deploy (provision) components of that type as well as of how to handle ongoing management operations on those same components. Only blueprints containing such supported components may be realized by the automation engine. To protect the user experience, blueprint design tools may be limited to designing only applications that can be realized.

Adding expertise to a complex automation engine to support a wider selection of component types consumes considerable skilled and costly effort. But this investment is well worth making owing to the simplification of effort it affords the authors of a potentially large set of blueprints. The skill and effort required to author a blueprint are far less than the skill and effort required to implement expertise into a complex automation engine.

Herein, a 'lifecycle' blueprint is a blueprint that serves as a template not only for the desired state of an IT application when it is initially deployed, but also throughout its entire lifecycle (birth, life and death). The blueprint includes configuration within it that apply both during initial deployment as well as during ongoing management of the application. Managing the application includes, for example, reconfiguring it to change some of its characteristics, scaling it up or down by adding or removing additional instances of its components, etc. The automation engine achieves this blueprint-driven management of an IT application by maintaining an association between the application and a snapshot copy of the original blueprint that was used to deploy it, throughout the lifetime of the application.

As shown in FIG. 1, an information-technology system 100 provides for lifecycle (creation through destruction) management of IT applications 102. Applications 102 run on an IT infrastructure 106 including hardware, e.g., processors 110, communications devices 112 (including input-output devices) and media 114 (e.g., memory, disks). Non-transitory media 114 is encoded with code 116 representing the software described herein including virtualization software 118 of IT infrastructure 106 and including blueprint system 120.

Blueprint system 120 includes source lifecycle blueprints 122, actors 124, an automation engine 126, and a workload manager 128. Source lifecycle blueprints 122 contain components 130 that serve as building blocks. Two types of blueprint components may be distinguished: basic blueprints 132 and nested blueprints 134. A blueprint may incorporate another ("nested") blueprint as a component. Components that are not blueprints themselves are "basic" components. The expertise required by a basic component can be included in the basic component itself and/or in respective external "actors".

When deploying an application using a blueprint, an end-user (human or some automated entity) provides two pieces of information. The first of these is the id of the blueprint that should be used. The second item is a map of name-value pairs that represent the user's final values for any properties in the blueprint that may be overridden or need values to be supplied. This latter input is called request data. Given the blueprint and request data, the automation engine has enough information to deploy the application.

The automation engine uses its inputs to first generate an execution plan. The execution plan is a workflow that is a representation of all the activities that need to happen in order to provision the application. Examples of such activities include allocating capacity for a virtual machine, actually provisioning the virtual machine, running the installer for an application server, running the configuration script for a load balancer, etc.

Figures 3, 4:
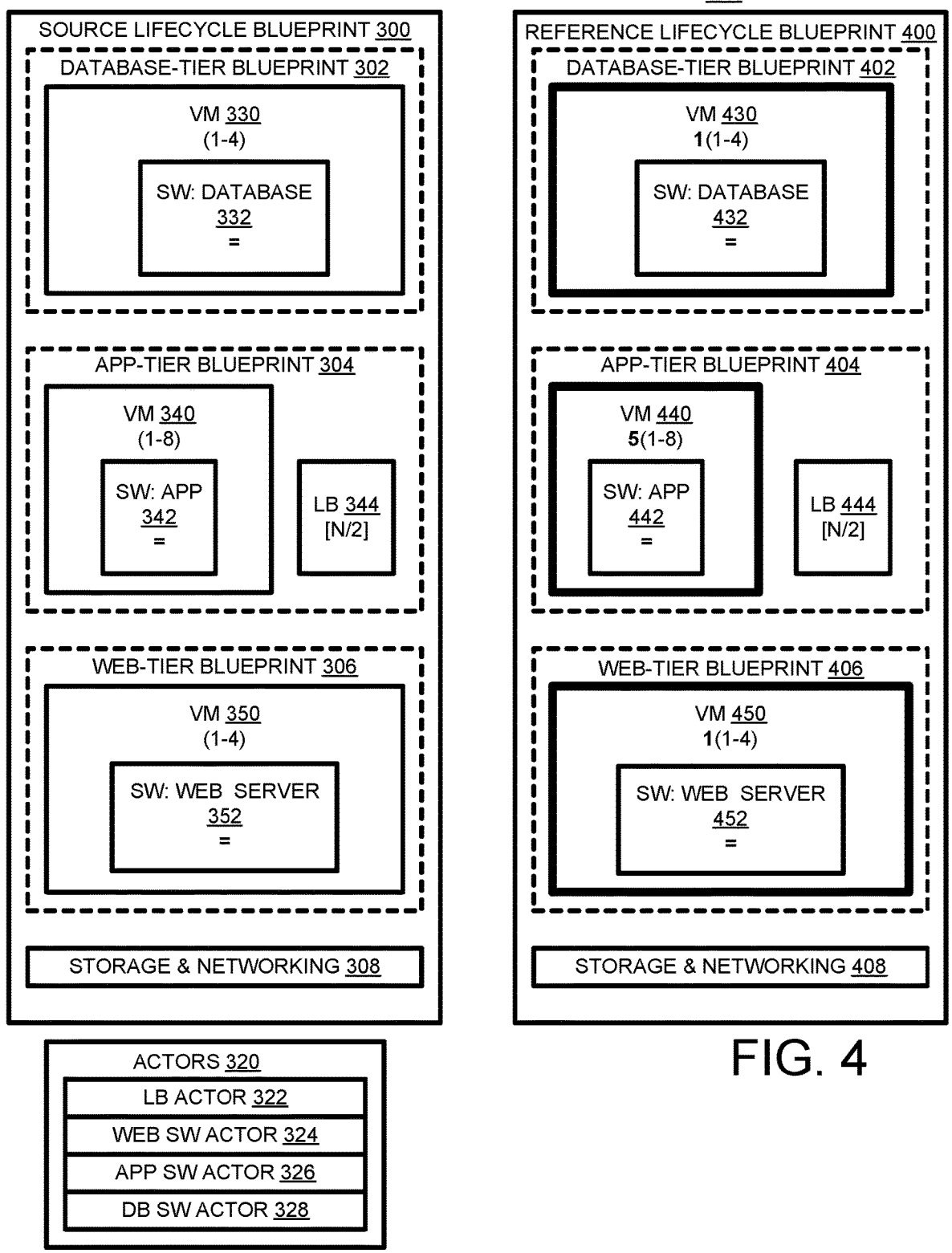
FIG. 3 is a source lifecycle blueprint used to deploy the IT application of FIG. 2.
FIG. 4 is a reference lifecycle blueprint used for post-deployment management of the IT application of FIG. 2.

During deployment, a "snapshot" or replica of the original blueprint is made, yielding a "reference" lifecycle blueprint 400, detailed in FIG. 4. The reference blueprint 400 is associated with, i.e., dedicated to, the IT application that results from deployment. Either of the original blueprint and the reference blueprint can be modified without modifying the other. The reference blueprint is altered to add in request data which specifies selections where the original blueprint provides a choice. For example, if a source blueprint allows a selection from a range of 1-10 virtual machines, the reference blueprint can add that the user selected five virtual machines without affecting the original blueprint. From one perspective, a reference blueprint can be a customized source blueprint.

The selections made to effect deployment of an IT application may be modified post-deployment. Thus, the reference blueprint can be used as reference to generate an execution plan to modify the associated IT application. For example, the original selection of five virtual machines can be updated to six virtual machines, after verifying that the new request data value of six is within the permitted range captured in the reference blueprint.

When a scale-out request is made to automation engine 126, the associated IT application is modified to include six virtual machines where there were only five before. This scenario is spelled out below.

Figure 2:
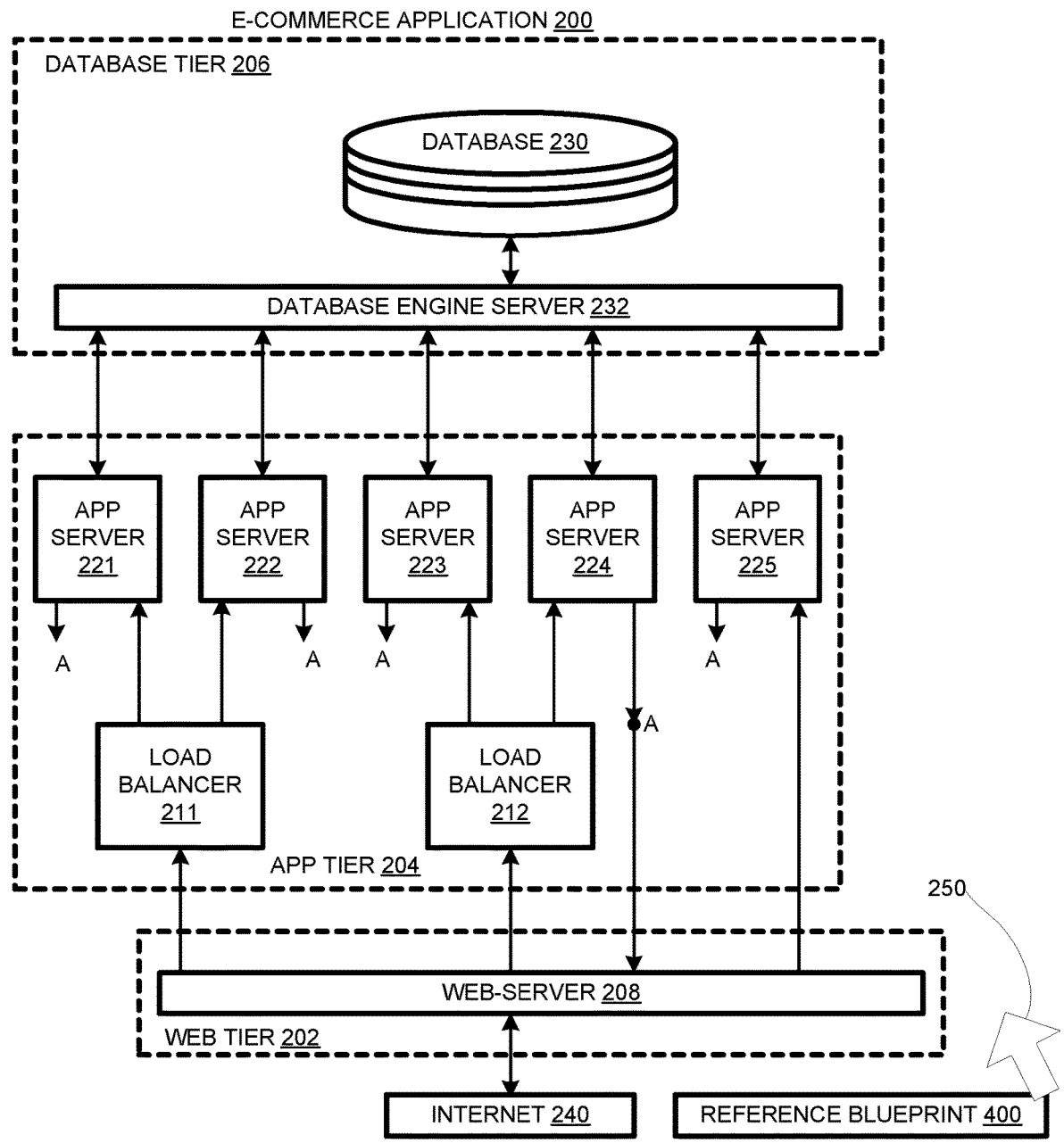
FIG. 2 is a schematic diagram of an e-commerce IT application created and managed by the IT automation system of FIG. 1.

A three-tier e-commerce IT application 200 is shown in FIG. 2 including a web tier 202, an app tier 204, and a database tier 206. Web tier 202 includes a single web server 208, that is, a single virtual machine running web server software. One function of web-server 208 is to receive requests over the Internet and forward them to a single app server or distribute them among plural app servers, that is, virtual machines that execute e-commerce apps.

In the case app tier 204 includes plural functionally identical app servers, web server 208 could, in principle, distribute the transactions evenly among the plural app servers. However, transactions can vary considerably in complexity such that a first app server may handle a single complex transaction in the time a second server handles many simple transactions. If the first server receives a series of complex transactions, it may become a bottleneck and appear slower than desired to a client/user. A load balancer can detect when an app server is backing up and preferentially forward requests to another app server until the backup is cleared.

Figures 5, 6:
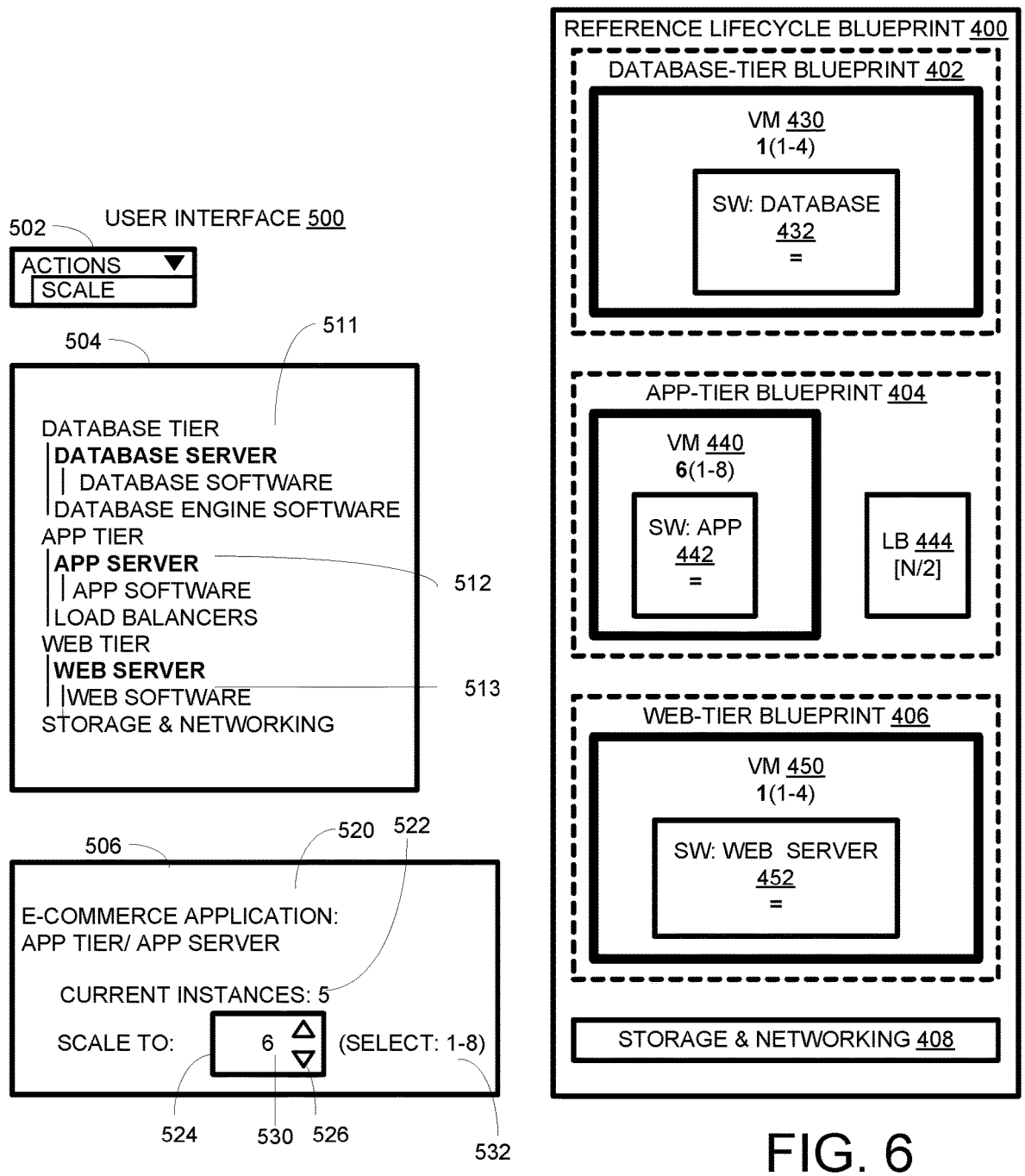
FIG. 5 is a directory-tree topological user interface for modifying the reference blueprint of FIG. 4.
FIG. 6 is the reference lifecycle blueprint of FIG. 4 after modification using the user interface of FIG. 5.

If a five-way load balancer were available, it might be used in app tier 204 given the five app servers as in FIG. 5. However, in the illustrated embodiment, only two-way load balancers are available. Two load balancers 211 and 212 are used to service two app servers 221 and 222, and 223 and 224 each. The remaining app server 225 is fed directly by web server 208.

Some, but not necessarily all, transactions may require a query to a database 230 via a database engine running on a database engine server 232 of database tier 206. Accordingly, each app server 221-225 is arranged to communicate with database engine server 232. The database engine formulates queries into a form understood by database 230. The responses may be reformatted for consumption by an app server, and forwarded to the app server that presented the respective query. Responses are processed and packaged by the respective app server and forwarded to the client/user via web server 208 (via node A, as represented in FIG. 2) and the Internet 240.

As shown in FIG. 2, reference blueprint 400 is dedicated to (e.g., as indicated by arrow 250) e-commerce application 200. Reference blueprint 400 has been provisioned to realize e-commerce application 200. Post deployment, reference blueprint 400 is used as a reference to modify, e.g., scale out, e-commerce application 200.

To this end, a value, e.g., a number of app servers, previously applied to e-commerce application 200 is changed in reference blueprint 400, and then reference blueprint 400 is used to implement the corresponding change in e-commerce application 200. In this way, reference blueprint 400 remains "coherent" or in "synchronization" with e-commerce application 200 and can be used, e.g., by automation engine 126, (FIG. 1) as a description of the current configuration of e-commerce application 200.

As shown in FIG. 3, a source lifecycle blueprint 300 used to deploy e-commerce application 200 (FIG. 2), includes a database-tier blueprint 302, an app-tier blueprint 304, a web-tier blueprint 306, and storage and networking components 308. The actors include a web-software actor 324 (e.g., with installation instructions), an app-software actor 326, and a database-software actor 328 in addition to actors for virtual machines, storage components and networking components.

Database-tier blueprint 302 includes a virtual-machine blueprint 330 and a database-software basic component 332. Database-tier blueprint 302 specifies a range of 1-4 virtual machines to be used as database servers, with the exact number to be selected, e.g., as part of a deployment request. Database-tier blueprint 302 further specifies, with respect to database-software component 332, that the number of software installations is equal to the (to-be determined) selected number of database servers.

App-tier blueprint 304 includes a virtual-machine blueprint 340, an app software basic component 342, and load balancer basic component 344. App-tier blueprint 304 allows a selection from a range of 1-8 virtual machines. App-tier blueprint 304 specifies that the number of instances of app-server software is to be equal (=) to the number of virtual-machine blueprint instances in blueprint 304.

Web-tier blueprint 306 includes a virtual machine blueprint 350 and a web server software basic component 352. Web-tier blueprint 306 specifies a range of 1-4 virtual machines, from which a value can be selected for deployment. Web-tier blueprint 306 further specifies that the number of web-software installations is to be equal to the number of virtual machines deployed.

Reference lifecycle blueprint 400, shown in FIG. 4, is created by taking a snapshot of source lifecycle blueprint 300 or a substitute blueprint. Therefore, at least initially, reference lifecycle blueprint 400 has instances of the same components in the same arrangement as source lifecycle blueprint 300. Management policies may cause the reference blueprint to diverge from the source blueprint. At the very least, choices required for deployment are made in the reference blueprint prior to provisioning. For example, in FIG. 4, numbers of virtual machines have been selected for respective tiers.

Reference lifecycle blueprint 400 includes: a database-tier blueprint component 402, with a virtual-machine blueprint component 430 and a database-software basic component 432; an app-tier blueprint component 404 with a virtual-machine blueprint component 440, an app-server software basic component 442, and a load-balancer basic component 444; and a web-tier blueprint component with a virtual-machine blueprint component 450 and a web-server software component 452. In addition, reference lifecycle blueprint 400 includes storage and network components 408.

As illustrated, reference lifecycle blueprint 400 indicates that "1" is the number of virtual-machine instances selected from the original range of 1-4 virtual machines specified for the database tier; "5" is the number of virtual-machine instances selected for the app tier, and "1" is the number of virtual-machine instances selected for the web tier. Respectively equal numbers of software installations are to be selected for the tiers. The number of load balancers for the app tier is calculated to be [5/2]=2.

As indicated above, reference lifecycle blueprint 400 may be a snapshot of a "substitute" source lifecycle blueprint. For example, upon a deployment request, the deployment engine may look for an updated version of the requested blueprint and, if found, substitute it for the original blueprint. In such a case, the snapshot is taken of the updated version. Selected values are then indicated by the reference blueprint 400 as shown in FIG. 4.

From another perspective, FIG. 4 can serve as a user interface element 460. In FIG. 4 the components are arranged as a nested topological representation of a blueprint. The components (430, 440, and 450) that specify a range are highlighted (by a thick boundary to indicate they may be selected, e.g., for scaling out or in. Other blueprint components are relatively dim to indicate that they cannot be selected for scaling or for whatever the selected action is. By "topological" is meant that the graphical relationships among representations (of blueprint components) correspond to the relations among the blueprint components represented.

Alternatively, a directory-tree topological user interface 500, shown in FIG. 5, can include a drop-down menu 502 for selecting a modification action to be performed on an application, a directory-tree representation 504 of the reference blueprint for the application, and a dialogue box 506. An action such as scaling, updating a (software) component, or adding a component can be selected. The components 511-513 to which the action may be applied are highlighted (e.g., bolded) in the directory tree. Selecting (e.g., clicking on) a highlighted component representation in the tree calls a dialogue box, e.g., dialog box 506. The un-highlighted items cannot be selected or activated to yield a dialog box.

Dialogue box 506 identifies the directory path name 520 for the selected component. The quantity 522 of current instances, in this case "5", is indicated. A numeric selection box 524 has up and down arrows 526 that can be used to increase or decrease the number of current instances. In the illustrated scenario, the up arrow has been clicked so that the "scale to" value 530 now equals "6". Entering the change modifies reference lifecycle blueprint 400, with the result indicated in FIG. 6, in which the number of current instances is "6" rather than "5".

Figure 7:
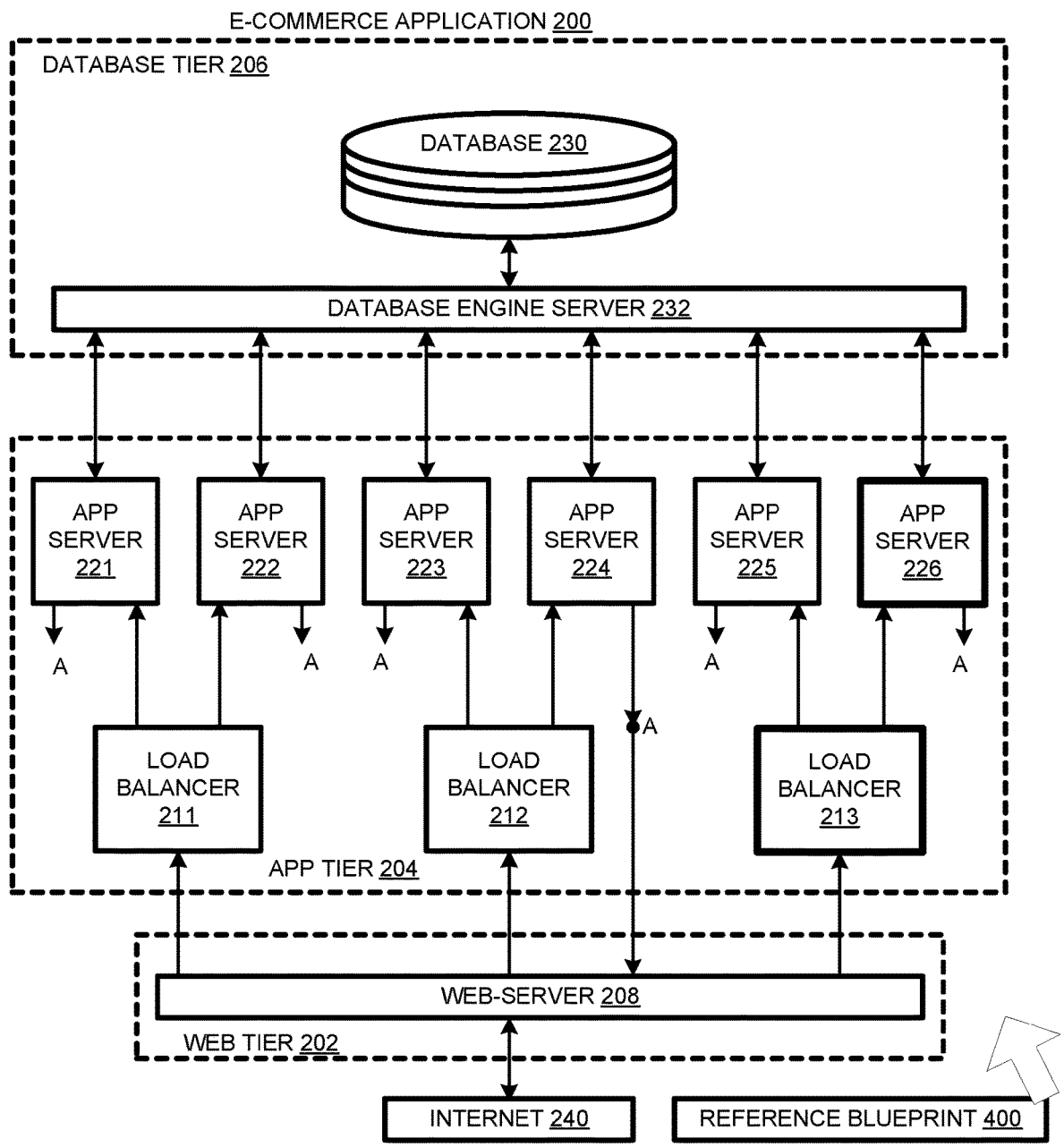
FIG. 7 is the IT application of FIG. 2 after modification resulting from deployment of the reference lifecycle blueprint of FIG. 6.

When the scale-out request is executed, a sixth app server 226 is created in app tier 204 and added to e-commerce application 200, as shown in FIG. 7. Since there are then six app servers, the formula [N/2] for load balancers requires three load balancers instead of two. Therefore, a third load balancer 213 is created and added to app tier 204. App server software is then installed on the added virtual machine. Internet protocol (IP) addresses are then assigned to the new server and the new load balancer. The new load balancer is informed of the IP addresses of the app servers it services, and web server 208 is informed of the IP address for the third load balancer 213.

Figure 8A:
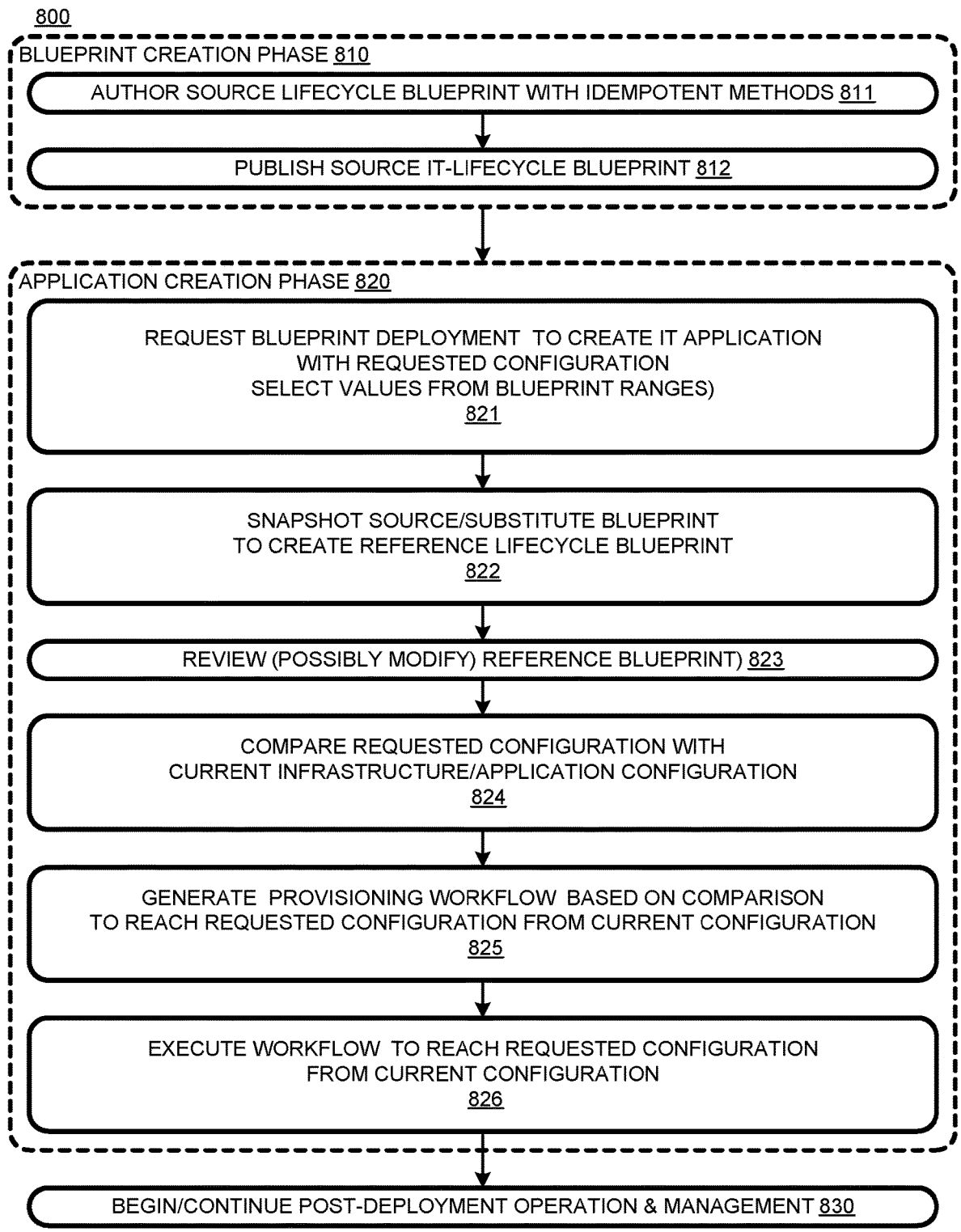
FIGS. 8A and 8B constitute a flow chart of an IT application lifecycle process applicable to the IT applications of FIG. 1 and other IT applications.
Figure 8B:
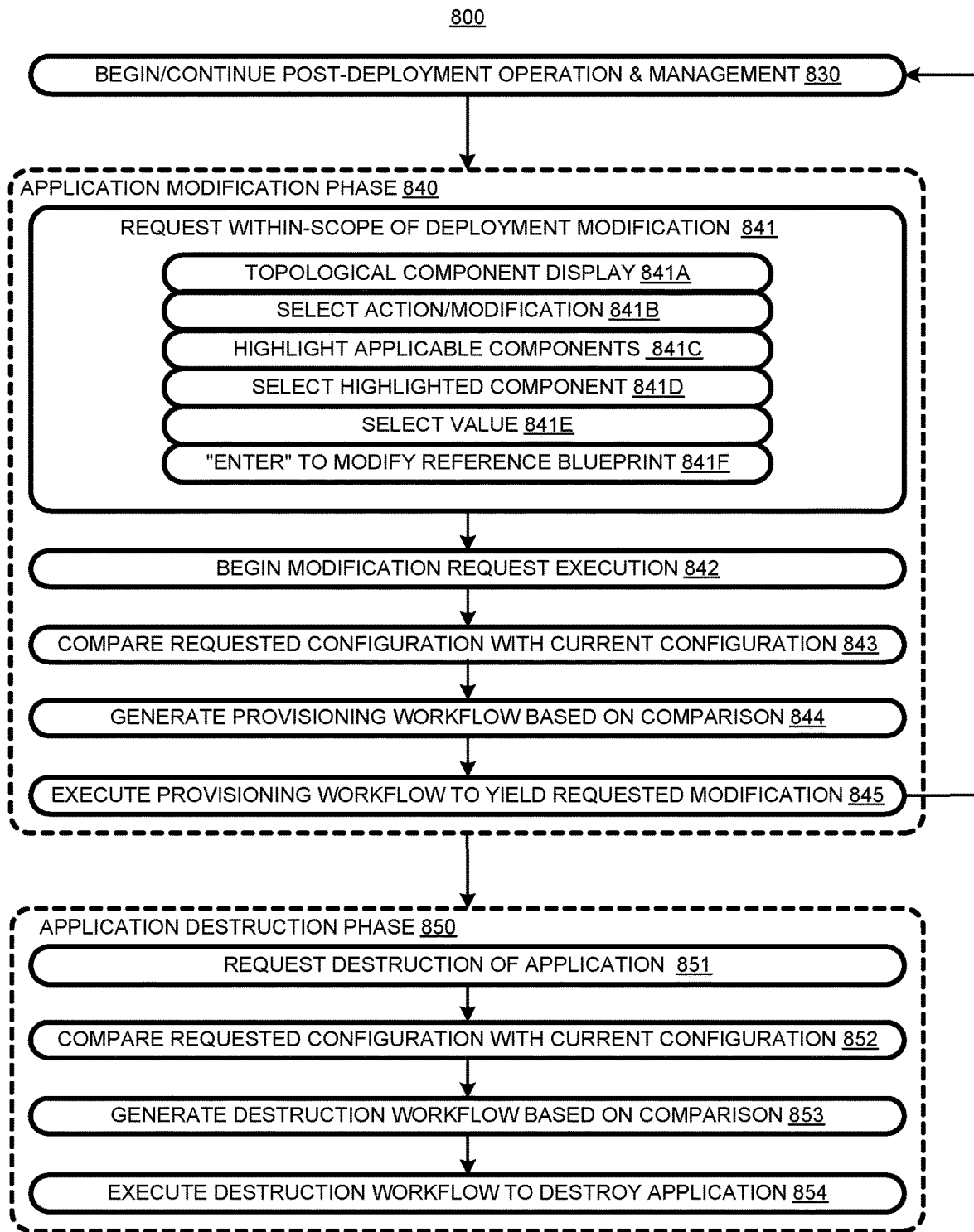

A lifecycle blueprint process 800, flow charted in FIGS. 8A and 8B, can be implemented in IT automation system 100 (FIG. 1) and other systems. A blueprint creation phase 810 begins, at 811, with authoring a source IT-lifecycle blueprint that includes expertise, e.g., in the form of idempotent methods, for creating, managing, and destroying an IT application. The blueprint also includes components, e.g., basic components and blueprint components. Components may have further expertise embodied in actors that are external to the blueprint. At 812, the source IT-application blueprint is published. This means it is available for deployment in a production setting.

An application creation phase 820 begins, at 821, with a request to deploy a blueprint to create an IT application with a requested configuration. To that end, the request may specify values selected from ranges allowed by the blueprint. Alternatively, some or all of those values can be specified during deployment. The request can be made by a human user or by an automated entity, e.g., in accordance with some management policy.

At 822, a reference lifecycle blueprint is created. In most cases, the reference blueprint is created by taking a snapshot of the source blueprint so that the reference blueprint is a replica of the source blueprint. However, in some cases, a blueprint is substituted for the source blueprint and the snapshot is taken of the substitute. The substitute can be derived by copying and modifying the source blueprint. For example, the deployment process may check to see if there are any updates available for the requested blueprint. If there is an update, the updated version may be the substitute and serve as the subject of the snapshot used to create the reference blueprint. In any case, the source and reference blueprints may be modified independently of each other, so they can diverge from each other. At 823, the reference lifecycle blueprint is reviewed for compliance with management and other policies. This review can include automated and human-participation approval procedures, and may result in a rejection of the deployment request, approval without modification, or approval with modification.

At 824, the blueprint method compares the requested configuration with the current infrastructure/application configuration. For example, the target virtual infrastructure may not be hosting any IT components, or there may be some remnants from a previous failure to create an IT application at the infrastructure. At 825, a provisioning workflow is generated based on the comparison and designed to reach the requested application configuration from the current configuration. At 826, the provisioning workflow is executed to establish the application in the requested configuration. This completes application creation phase 820. At 830, post-deployment operation and management are begun and continued.

Once an application is in operation, it may be modified in an application modification phase 840, shown in FIG. 8B. At 841, a request is made and received for a within-scope-of-deployment blueprint modification. Blueprints that offer a selection of values for one or more parameters can be said to offer a range of application deployment configurations based on the values selected, e.g., in the request. Once the application is deployed, there may be a reason to change some of the value selections. In the example presented in FIGS. 4-7, a range is 1-8 and the modification was from 5 to 6 (app servers). The reference blueprint could have deployed 6 servers originally if that value had been selected in the original deployment request. So the modification from 5 to 6 is within the deployable scope of the reference blueprint. On the other hand, selecting a modification from 5 to 9 would not be within the allowed blueprint range of 1-8.

Action 841 can be implemented as indicated in FIG. 8B. At 841A, a blueprint is displayed topologically, e.g., as in either FIG. 4 or FIG. 5. At 841B, the desired action or modification is selected. For example, a scale-in or scale-out action may be selected. At 841C, the components to which the action/modification is applicable are highlighted relative to components to which the action/modification is not applicable. For example, thicker lines, bolding, colors, etc., can be used to highlight in a representation of the reference blueprint, which may also be a representation of the application's current state. If a new action is selected, thereby repeating action 841B, then action 841C is repeated so that the components that the new action can apply to are highlighted and those to which the new action does not apply are not or no longer highlighted.

At 841D, one of the highlighted components is selected. In this case, the current value of a parameter relating to the selected action/modification is presented. At 841E, the new value is selected, e.g., by manipulating value controls or by overwriting the old value. At 841F, the new value may be "entered" so that the reference blueprint is modified to include the new value. This process is explained above with reference to FIG. 5.

At 842, execution of the modification request is begun. At 843, the requested configuration is compared with the current configuration. At 844, based on the comparison, a workflow is generated designed to convert the current configuration to the requested configuration. At 845, the workflow is executed so that the application matches the configuration expressed by the modified reference lifecycle blueprint. The application modification phase is thus complete. However, process 800 provides for looping back to post-deployment operation 830, allowing for further modifications by iterating application modification phase 840.

At some point, the application may no longer be required. Thus, an application destruction phase 850 begins, at 851, with a request to destroy the application. At 852, the desired application-free infrastructure configuration is compared to the current application configuration. At 853, based on the comparison, a destruction workflow is generated. At 854, the destruction workflow is executed to destroy the application. This completes destruction phase 850 and lifecycle process 800.

In process 800 of FIGS. 8A and 8B, idempotency is apparent in the workflows that are generated based on a comparison of requested and current configurations, as at actions 825, 844, and 852. These workflows are generated in accordance with the methods of the dedicated reference lifecycle blueprint and based on the current configuration of the application (if any) and the target infrastructure. The methods determine what tasks are to be included in a workflow and the order in which the tasks are to be executed.

For example, one task can be to create a virtual machine, and another task can be to install a particular software app on the virtual machine. Clearly, the virtual machine should be created before the software is installed on it. Also, the virtual machine should be created before an IP (Internet Protocol) address can be assigned to it. Only after the address is assigned, can other components be informed of the assignment so that they can communicate with the new combination of virtual machine and app software. Various dependencies must also be considered when destroying components, as may occur in a scaling-in modification or destruction of an application. IP addresses may be de-assigned, property-bound values may be unbound, and hosted components destroyed or removed before their hosts are removed.

Thus, the workflow for creating or modifying a complex IT application can include a large number of tasks, many of which rely on other tasks to have been completed for their own execution. A failure of one task can impact many others that follow it in the workflow. The challenge is to figure out how to handle a failed workflow task in the context of an IT system that uses lifecycle blueprints.

In both the "same workflow" and the "new workflow" variations, execution of a workflow proceeds uninterrupted from beginning to end so that the automation engine that executes the workflows remains coherent with the application state. Thus the blueprint dedicated to the IT application can continue to be used to manage and eventually destroy the IT application.

A "lifecycle blueprint" is a blueprint that can be used to create, modify, and destroy an IT application. Herein, "derive" as applied to blueprints means obtain by copying and modifying one or more other blueprints. "Scaling" herein refers to changing the number of instances of a component in an IT application. "Scaling-out" means increasing the number; "scaling-in" means decreasing the number. The terms "parent" and "child" are defined relative to each other; a parent (application or blueprint) component includes a respective child component, or a child component somehow, e.g., through property binding, depends on a respective parent component.

A lifecycle blueprint can be "assigned" or "dedicated" to an IT application if it is used to manage/modify the IT application. Thus, in FIGS. 2 and 7, reference lifecycle blueprint 400 is dedicated to IT application 200. Typically, reference lifecycle blueprints are dedicated, and source lifecycle blueprints are not dedicated to a specific IT application. Typically, at most one lifecycle blueprint is dedicated to an IT application at any given time.

The lifecycle blueprints herein include "idempotent" methods, that is, methods that reach the same result despite different initial conditions. Idempotency allows methods used to create an IT application to also be used to modify the IT application. Idempotency may involve comparing a requested configuration of a target infrastructure with its current configuration and then generating a workflow designed to modify the current configuration to attain the requested configuration. The configuration of the target infrastructure is typically the configuration of the IT application, if any, executing on the target infrastructure.

Herein, art labeled "prior art", if any, is admitted prior art; art not labelled prior art, if any, is not admitted prior art. The illustrated and other embodiments, as well as variations upon and modifications thereto, are provided for by the present invention, the scope of which is defined by the following claims.

What we claim is:

1. A process comprising:
   creating an information-technology (IT) application by deploying a first lifecycle blueprint to a first real or virtual infrastructure;
   modifying the IT application at least in part by executing the first lifecycle blueprint or a second lifecycle blueprint, wherein said first lifecycle blueprint includes at least one idempotent method that can be used for an initial deployment of said IT application and for a post-deployment modification of said IT application, said post deployment modification of said IT application resulting in a generation of a modified IT application;
   further modifying said modified IT application by iteratively performing said post-deployment modification, such that said modified IT application is further modified to result in a generation of a modified version of said modified IT application;
   generating a modified blueprint based upon differences between said IT application and said modified IT application, said modified blueprint differs from said first lifecycle blueprint;
   requesting configuration of said IT application according to said modified blueprint;
   comparing the requested configuration of said IT application with a current configuration of said IT application;
   generating a provisioning workflow based on the comparison for converting said IT application from the current configuration to the requested configuration; and
   executing the provisioning workflow to yield the requested configuration of said IT application.

2. The process of claim 1 further comprising deriving the second lifecycle blueprint from the first lifecycle blueprint such that the IT application is within a deployable range of the second lifecycle blueprint.

3. The process of claim 1 wherein the first lifecycle blueprint specifies a range of values from which a value can be selected for an attribute of the IT application, the modification including a change of that value after the IT application is created.

4. The process of claim 1 wherein the first lifecycle blueprint and the second lifecycle blueprint include as components both nested blueprints and basic components.

5. The process of claim 4 wherein the modifying includes executing an idempotent method of a nested blueprint.

6. The process of claim 4 wherein the modifying includes executing an idempotent method of an actor external to the second lifecycle blueprint.

7. The process of claim 1 further comprising destroying the application by executing a method of the first lifecycle blueprint or the second lifecycle blueprint.

8. A system comprising non-transitory media encoded with code that, when executed using hardware, implements a process including:
   creating an information-technology (IT) application by deploying a first lifecycle blueprint to a first real or virtual infrastructure;
   modifying the IT application at least in part by executing the first lifecycle blueprint or a second lifecycle blueprint, wherein said first lifecycle blueprint includes at least one idempotent method that can be used for an initial deployment of said IT application and for a post-deployment modification of said IT application, said post deployment modification of said IT application resulting in a generation of a modified IT application;
   further modifying said modified IT application by iteratively performing said post-deployment modification, such that said modified IT application is further modified to result in a generation of a modified version of said modified IT application;
   generating a modified blueprint based upon differences between said IT application and said modified IT application, said modified blueprint differs from said first lifecycle blueprint;
   requesting configuration of said IT application according to said modified blueprint;
   comparing the requested configuration of said IT application with a current configuration of said IT application;
   generating a provisioning workflow based on the comparison for converting said IT application from the current configuration to the requested configuration; and
   executing the provisioning workflow to yield the requested configuration of said IT application.

9. The system of claim 8 wherein the process further includes deriving the second lifecycle blueprint from the first lifecycle blueprint such that the IT application is within a deployable range of the second lifecycle blueprint.

10. The system of claim 8 wherein the first lifecycle blueprint specifies a range of values from which a value can be selected for an attribute of the IT application, the modification including a change of that value after the IT application is created.

11. The system of claim 8 wherein the first lifecycle blueprint and the second lifecycle blueprint include as components both nested blueprints and basic components.

12. The system of claim 11 wherein the modifying includes executing an idempotent method of a nested blueprint.

13. The system of claim 11 wherein the modifying includes executing an idempotent method of an actor external to the second lifecycle blueprint.

14. The system of claim 8 further comprising destroying the application by executing a method of the second lifecycle blueprint.

15. The system of claim 8 further comprising the hardware.

\* \* \* \* \*